United States Patent
Braun et al.

(10) Patent No.: US 7,455,239 B2
(45) Date of Patent: *Nov. 25, 2008

(54) COOLING SYSTEM FOR AN INTERNAL COMBUSTION ENGINE OF A MOTOR VEHICLE

(75) Inventors: Hans Braun, Stuttgart (DE); Ralf Körber, Stuttgart (DE); Michael Timmann, Eutingen (DE); Jochen Weeber, Filderstadt (DE)

(73) Assignee: Daimler AG, Stuttgart (DE)

( * ) Notice: Subject to any disclaimer, the term of this patent is extended or adjusted under 35 U.S.C. 154(b) by 452 days.

This patent is subject to a terminal disclaimer.

(21) Appl. No.: 10/966,105

(22) Filed: Oct. 18, 2004

(65) Prior Publication Data

US 2005/0081801 A1    Apr. 21, 2005

(30) Foreign Application Priority Data

Oct. 16, 2003   (DE) ................................ 103 48 130

(51) Int. Cl.
*F01P 7/02* (2006.01)

(52) U.S. Cl. .................. 236/34; 236/46 R; 123/41.05

(58) Field of Classification Search ............ 123/41.01, 123/41.02, 41.05, 41.08, 41.1, 41.11, 41.12, 123/41.13, 41.31, 41.48, 41.49, 41.51, 41.55, 123/41.63, 41.65; 165/244; 236/34, 46 R
See application file for complete search history.

(56) References Cited

U.S. PATENT DOCUMENTS 4,425,766 A * 1/1984 Claypole .................... 62/133
4,559,907 A * 12/1985 Hayashi ................. 123/41.12
4,779,577 A * 10/1988 Ritter et al. .............. 123/41.05

(Continued)

FOREIGN PATENT DOCUMENTS

DE       197 28 814 A1    1/1999

(Continued)

OTHER PUBLICATIONS

Banzhaf, M., "Der 'Intelligente Kühikreislauf': ein neues Konzept für die Motorkühlung", ATZ Automobiltechnische Zeitschrift, Stuttgart, vol. 95, No. 9, Sep. 1993, pp. iv-vi.

*Primary Examiner*—Mohammad M Ali
(74) *Attorney, Agent, or Firm*—Fitch, Even, Tabin & Flannery; Norman N. Kunitz (57) ABSTRACT

The invention relates to a cooling system in which the fan output is determined by an output control from the characteristic curves of the fan motor, the operating parameters of the cooling system and the reference input variables predetermined in the form of temperature levels. Different characteristic curves for the activation of the fan motor are here assigned to the different set temperature levels. If the reference input variable for the control changes, this also results in a change of the characteristic curves for activation of the fan motor. In order to prevent the fan motor starting to howl, in the event of a change in the reference input variable for the fan control the operation of the fan motor is kept constant for an adjustable minimum waiting time. During this minimum waiting time, switching over of the cooling circuit may have caused the operating parameters of the cooling system to adjust to the new reference input variable to such a degree that howling of the fan motor is no longer of concern.

13 Claims, 4 Drawing Sheets

U.S. PATENT DOCUMENTS

| | | | |
|---|---|---|---|
| 4,955,431 A * | 9/1990 | Saur et al. | 165/271 |
| 6,055,947 A * | 5/2000 | Okuno | 123/41.13 |
| 6,101,987 A * | 8/2000 | Saur et al. | 123/41.1 |
| 6,591,174 B2 * | 7/2003 | Chung et al. | 701/36 |
| 6,894,883 B2 * | 5/2005 | Buchholz | 361/103 |

FOREIGN PATENT DOCUMENTS

| | | |
|---|---|---|
| DE | 101 63 943 A1 | 7/2003 |
| FR | 2 808 305 | 11/2001 |
| JP | 2000-097027 A | 4/2000 |

* cited by examiner

COOLING SYSTEM FOR AN INTERNAL COMBUSTION ENGINE OF A MOTOR VEHICLE

CROSS REFERENCE TO RELATED APPLICATION

This application claims the priority of German Patent Application No. 103 48 130.3, filed on Oct. 16, 2003, the subject matter of which, in its entirety, is incorporated herein by reference.

FIELD OF THE INVENTION

The invention relates to a cooling system for an internal combustion engine of a motor vehicle having an output control for a fan motor. The fan control here determines the fan output on the basis of characteristics of the fan motor and on the basis of operating parameters of the cooling system and predefined reference input variables, which determine a set temperature level. The fan control here makes it possible to change the set temperature levels and to change the fan characteristics without the fan motor cutting in in response to the change in the fan characteristics.

BACKGROUND OF THE INVENTION

German patent application DE 197 28 814 A1 discloses a cooling system of the generic type. Various temperature levels are to be set in a cooling system for an internal combustion engine of a motor vehicle. The temperature levels to be set here represent the reference input variables for a fan control, which by means of a control program determines the required fan output. The fan output is here determined from the operating parameters of the cooling system, from the reference input variable, and from sets of characteristic curves and characteristics of the fan motor. The operation of the fan is here suspended until the coolant in the cooling system has reached and exceeded a minimum temperature. This is intended to ensure that the internal combustion engine comes up to operating temperature as rapidly as possible and that the fan motor cannot start to exercise a premature cooling effect. Once the fan function is enabled, the control program adjusts the fan output to the set temperature level. Here there are two particular temperature levels of 90° C. and 108° C. to which the fan output has to be adjusted.

The aforementioned cooling system is therefore efficient in as much as it reaches the temperature levels, predetermined as reference input variables, as rapidly as possible. Disadvantages occur, however, when changing from a high temperature level to a low temperature level, since the change of temperature level is predetermined by the change of reference input variable for the output control. In so doing this reference input variable steps down from 108° C. to 95°. The large temperature difference involved in a change of reference input variable from a high value to a low value causes the output control of the fan motor to detect a large temperature difference compared to the current actual temperature, which needs to be corrected as rapidly as possible. This means that the fan motor starts to howl at maximum power. Although this has the advantage that the low temperature level is attained as rapidly as possible, as a rule this is neither desirable nor necessary. The howling of the fan motor is therefore a noise nuisance and leads to unnecessary energy consumption.

This is the point of departure for the invention, the object of the invention being to improve the cooling system so that the fan motor does not start to howl when the set temperature level is changed from a high value to a low value.

SUMMARY OF THE INVENTION

This object is achieved by a cooling system according to the invention as described below. Advantageous developments of the system according to the invention are contained in the dependent claims and in the description of the examples of the embodiments.

The solution succeeds with a cooling system in which the fan output is determined by an output control from the characteristics of the fan motor, the operating parameters of the cooling system and the predetermined reference input variables in the form of temperature levels. In this, various characteristic curves for the activation of the fan motor are assigned to the various set temperature levels. If the reference input variable for the control changes, this also means a change in the characteristic curves for activation of the fan motor. In order to prevent the fan motor from starting to howl, in the event of a change in the reference input variable for the fan control the operating point of the fan motor is kept constant for an adjustable minimum waiting time. During this minimum waiting time, switching over of the cooling circuit may have caused the operating parameters of the cooling system to adjust to the new reference input variable to such a degree that howling of the fan motor is no longer of concern.

In an advantageous development of the invention the starting-up of the fan motor is damped by a filter, which is connected into the activation of the fan motor. This permits a slow start-up of the fan even when changing of the set temperature level gives rise to large temperature differences compared to the current, actual temperature of the system to be cooled. This filter preferably has a so-called PT1 characteristic.

Further advantageous developments of the invention include the facility for adjusting the minimum waiting time until the fan motor starts up and for purposely adjusting the manner of a necessary fan start-up to suit the system conditions. For this purpose, for example, the minimum waiting time may be purposely shortened as a function of the thermal load of the internal combustion engine, or the filter characteristics used to influence the start-up of the fan motor may be varied so that the fan runs up to higher outputs more rapidly. By using sensors to monitor the internal combustion engine, the cooling circuit and the ambient conditions, it is possible to reduce the effective duration of a filter setting adjustment if the operating conditions vary to such a degree that the selected filter settings are no longer warranted. For this purpose, for example, the minimum waiting time for cutting out of the fan motor is adjusted as a function of the set temperature level or of the relevant operating parameters. The filter settings are similarly adjusted as a function of the relevant operating parameters.

BRIEF DESCRIPTION OF THE DRAWINGS

Without any restriction of general validity, the invention will be explained in more detail below with reference to the example of a cooling system for an internal combustion engine. In so doing reference will be made to the following drawings, in which.

DETAILED DESCRIPTION OF THE INVENTION

Fan motors are usually used as a safeguard against overheating of the cooling system and the internal combustion engine. In addition to the fan control the cooling system usually has a primary temperature control in the form of a thermostat. The temperature in the cooling system is preferably regulated by this primary temperature control. Thermostats serving to switch closed cooling circuits are used for primary temperature control particularly on internal combustion engines. In this context thermostats are substantially more energy-saving than fan motors and moreover have the advantage that they are better at retaining the energy present in the system. Fan motors have the disadvantage here that they use a lot of energy simply extracting energy from an existing system. It is better, however, to retain the energy in the system and to endeavour to extract as much effective output from this as possible. The temperature control in a cooling system is therefore preferably accomplished by an energy-saving primary control, whilst the fan motor and the fan control are used only as an additional safeguard when a reliable temperature control can no longer be maintained by the primary control. In motor vehicles, in particular, the fan should therefore as far as possible never be used for temperature control in the cooling system. In known fan controls of the prior art, however, this can give rise to problems where, as already mentioned, the temperature level in a cooling system is to be reduced from a high level to a lower temperature level. These problems will be illustrated with reference to FIG. 1 whilst comparing the advantageous operating principle of a fan control according to the invention with the prior art.

Figure 1:
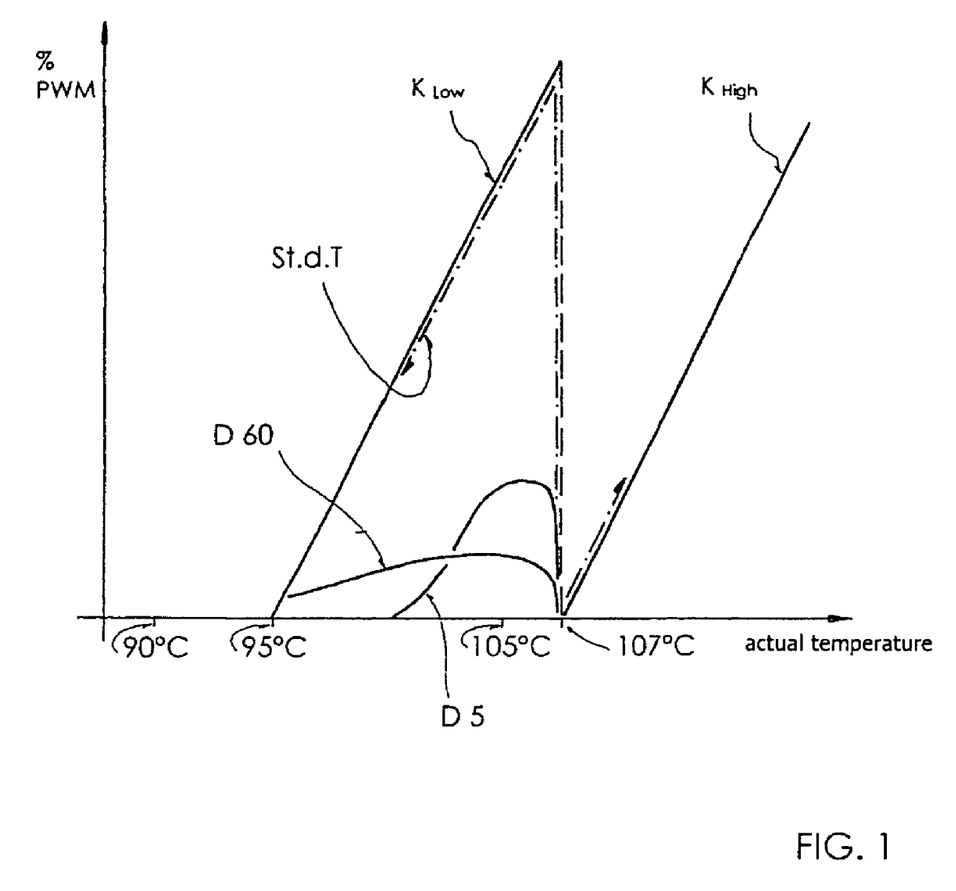
FIG. 1 shows a comparison between a fan drive control of the prior art and two examples of a fan drive control according to the invention.

In FIG. 1 the pulse duty factor of a pulse width modulation used to activate a fan motor and expressed in percentage PWM is plotted over the temperature in the cooling system. The cooling system is intended to set two different temperature levels, a temperature level at 90° C. and a second temperature level at 105° C. The temperature control is to be achieved predominantly by a primary control. The fan is intended as an additional safeguard against overheating and to cut in when the primary control is no longer capable of maintaining the predetermined temperature levels. A threshold value at which the fan motor starts to deliver increasing output for more cooling of system as the temperature rises is typically provided for each temperature level. In the example of embodiment in FIG. 1 a threshold of 95° C. is provided for the 90° temperature level and a threshold of 107° C. for the 105° temperature level. The higher the actual temperature deviates compared to this threshold, the greater the cooling capacity that will be required in order to return to the temperature level originally set. For the PWM activation of the fan motor this will give rise, in the simplest case, to fan characteristic curves for each set temperature level, and in complex situations to sets of characteristic curves consisting of multiple fan characteristic curves, from which at each actual temperature of the coolant in the cooling system a required activation signal for the output adjustment of the fan motor can be derived. In the example of embodiment in FIG. 1, showing the two characteristic curves $K_{high}$, $K_{low}$ for a change in the set temperature level from 105° C. to 90° C., the characteristic curve is also in principle switched from $K_{high}$ to $K_{low}$ for the fan control. The actual temperature of the cooling system, however, will not be immediately able to track the change of reference input variable from 105° C. to 90° C. For fan controls of the prior art therefore, this scenario will present the following problem in that in the event of a change in reference input variable to 90° C., the fan control will detect extreme overheating of the cooling system and the fan motor will start up towards the upper output end of its characteristic curve. The fan motor will really howl. FIG. 1 shows with a dash-dot line the curve for the activation signal, plotted over the pulse width modulation for the fan of the prior art and denoted by StdT. It will be seen that in the event of a downward shift in the reference input variable the working point will jump from the lower point on the characteristic curve $K_{high}$ for the upper temperature level to an upper high point on the characteristic curve $K_{low}$ for the lower temperature level. The invention is aimed at preventing this. According to the invention this is achieved in that in response to a change in the reference input variable the fan drive control is initially interrupted for a minimum length of time in order to allow the primary control the opportunity of setting the lower temperature level in the cooling system. If, after the minimum waiting time has elapsed, the lower temperature level has not yet been achieved by the primary control, howling of the fan motor can still be prevented by ensuring that the fan motor does not start up straight away at full power. According to the invention this is achieved by means of filters, which serve to attenuate the abrupt load reversal on the fan motor. This can be done, for example, by deriving the activation signal for the fan motor from the characteristic curve of the fan motor but, instead of using this to immediately activate the fan motor, using an input-side filter in order to ensure that the fan output makes an asymptotic approach to the working point on the fan characteristic curve. During this time the primary control has the opportunity of bringing about a temperature reduction, which is further assisted by the gently starting fan. Due to the delayed starting, possibly in combination with an additionally damped starting of the fan motor, the method according to the invention and the control program according to the invention tend to give rise to a signal pattern like that shown in the curves D5 and D60. The shape of the curve D60 here corresponds to a high-attenuation filter, whilst the shape of the curve D5 corresponds to a low-attenuation filter in the start-up control of the fan.

Figure 2:
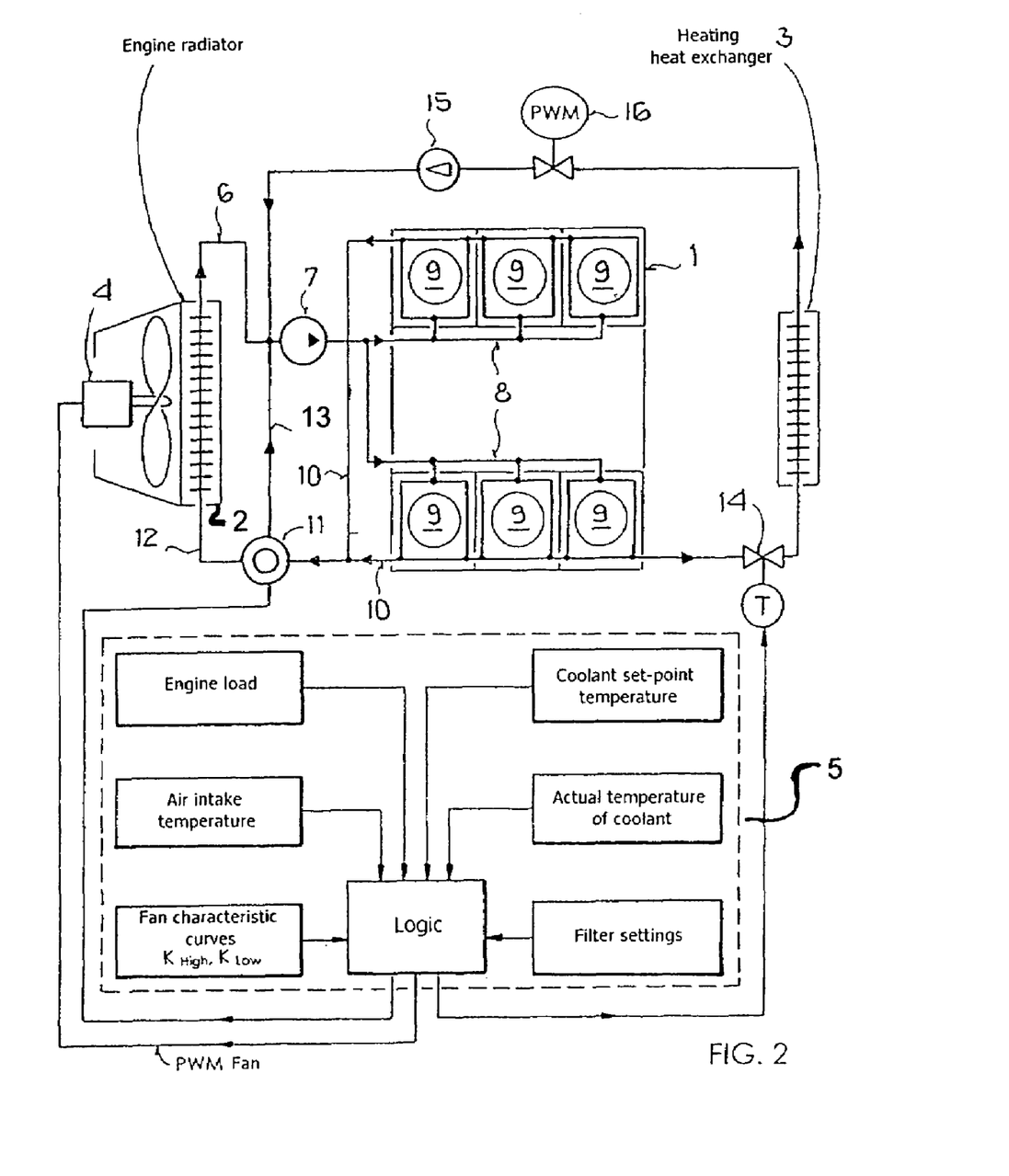
FIG. 2 shows a typical cooling system for an internal combustion engine, in which the temperature control and the fan drive control are achieved by means of a control unit, in which the most important influencing variables according to the invention are processed by a control unit.

FIG. 2 shows a schematic representation of a typical cooling system for a six-cylinder internal combustion engine 1. In addition to the internal combustion engine, the cooling system also incorporates a vehicle radiator 2 and heating heat exchanger 3. The cooling capacity of the vehicle radiator can be influenced by an electrically driven fan 4. For regulating the fan output the electric motor of the fan is controlled by a control unit 5. Cooled coolant is taken from the vehicle radiator by the flow pipe 6 and is fed by the coolant pump 7 into the cooling pipes 8 in order to supply the cooling passages (not shown further) for the combustion cylinders 9. From the combustion cylinders 9 the heated coolant is carried via return lines 10 to a three-way thermostat 11. Depending on the position of the valves in the three-way thermostat 11, the coolant from the internal combustion engine passes via the radiator return pipe 12 back into the vehicle radiator or via the radiator bypass 13 and the coolant pump 7 back into the cooling pipes 8 of the internal combustion engine.

Depending on the position of the valves in the three-way thermostat 11, the cooling system may here be run in bypass mode in a manner known in the art, in hybrid mode or in the full cooling circuit. The heating heat exchanger 3 is connected via a temperature-controlled shut-off valve 14 to the high-temperature branch of the cooling system in the internal combustion engine. The flow rate through the heating heat exchanger after opening of the shut-off valve 14 can be regulated by an additional electric coolant pump 15 and a timed shut-off valve 16 in order to regulate the heating output.

The activation of the actuators on the valves of the three-way thermostat 11 is here set by the control unit 5. The control unit contains a logic element in the form of a micro-processor. The control unit is preferably formed by the engine's electronic control unit or it forms an integral part of the engine's electronic control unit. The control unit 5 here activates the three-way thermostat 11 and the fan motor 4. The heating element in the three-way thermostat 11 is here activated in a manner known in the art. The three-way thermostat 11 here constitutes the control element for the aforementioned primary control, which is likewise implemented in the control unit 5 as control program for activation of the heating element in the three-way thermostat 11. Through suitable activation of the three-way thermostat 11, it is possible, in particular, to set and control three different temperature levels of 80° C., 90° C. and 105° C. in the cooling system of the internal combustion engine. The temperature level setting is in this case largely load-controlled. That is to say the cooling system temperature suited to the current demand is set with reference to the operating modes of the internal combustion engine, which in the engine electronics of a modern internal combustion engine can usually be read off in the form of digital signals, according to the demands being placed on the engine. The most important influencing variable is the engine load, which is determined, in particular, from the engine speed, the intake air quantity or the quantity of fuel injected into the combustion cylinders. If a satisfactory temperature control can no longer be achieved by the three-way thermostat 11 alone, the fan may be used for additional cooling. The fan motor 4 is here likewise activated by the control unit 5. The output of fan motors is usually regulated by a pulse width modulation. To do this, a control program calculates the required cooling capacity from the operating parameters of the cooling system, and once the current cooling capacity requirement is known determines, from the fan characteristic curves, the pulse duty factor of the pulse width modulation, with which the required cooling capacity can be produced. The most important influencing variables in determining the suitable fan output are the current engine load, the coolant set-point temperature, the actual temperature of the coolant, the intake air temperature and the fan characteristic curves. If it is proposed to run different temperature levels with the cooling system, different fan characteristic curves $K_{high}$, $K_{low}$ may be used for the various temperature levels.

According to the invention the cooling system is improved in that in the event of a fall in the temperature level in the cooling system starting up of the fan motor is prevented, at least for a minimum waiting time, and if it is still necessary to start up the fan after the minimum waiting time this start-up of the fan is damped in such a way that the working point of the fan control on the fan characteristic curve can be approached asymptotically. According to the invention this is achieved with a control program as will be described in more detail below with reference to FIG. 3.

Figure 3:
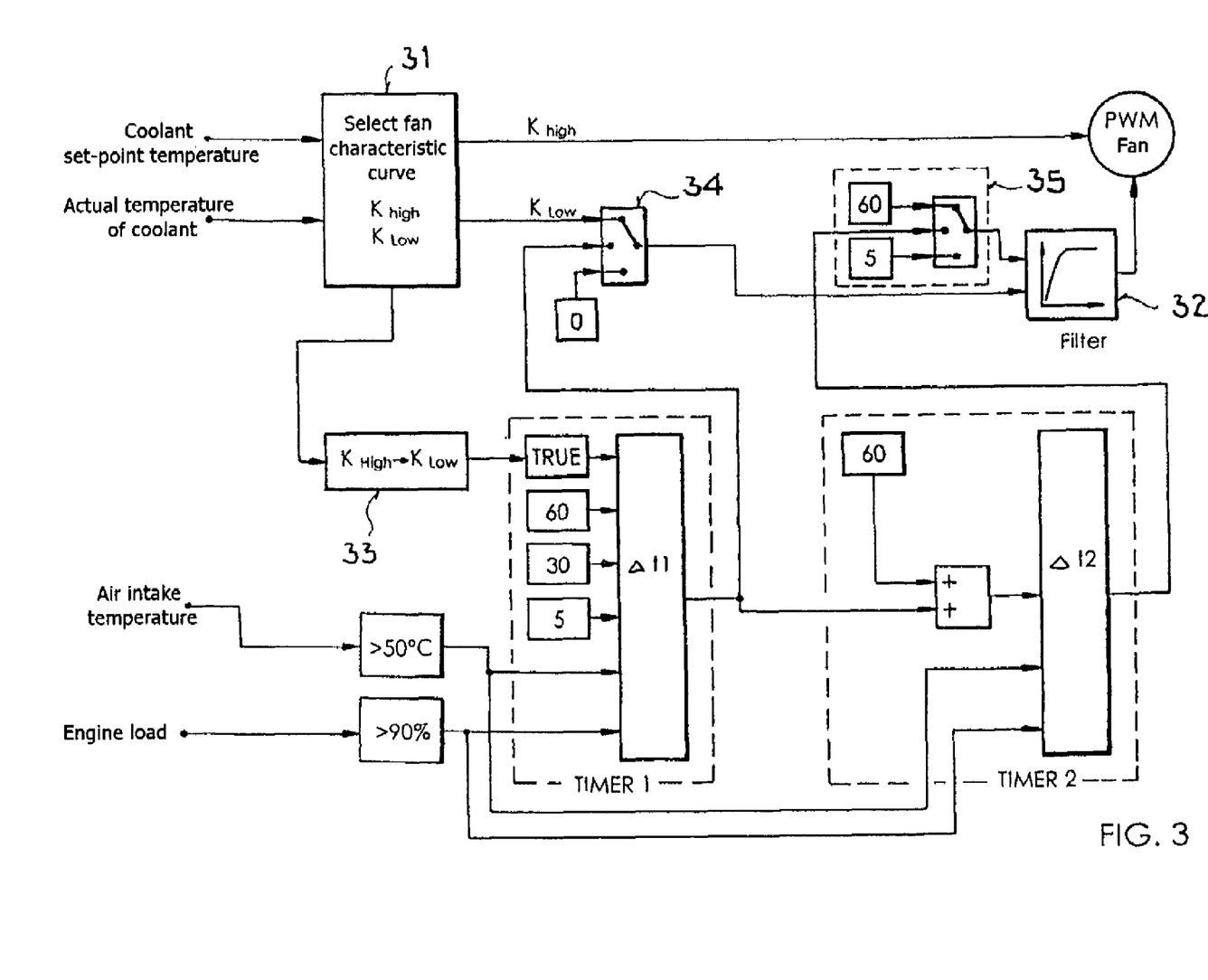
FIG. 3 shows a simplified functional block diagram and signal flow chart for the fan control.

FIG. 3 shows the functional block diagram and signal flow chart for the control program according to the invention. On the input side the control program processes signal values which are preferably derived from the engine management system and here from the engine control unit. These values are the coolant set-point temperature, the actual temperature of the coolant, the air intake temperature and a characteristic of the engine load at which the internal combustion engine is currently being operated. From the coolant set-point temperature predetermined by the engine management system an associated fan characteristic curve or an associated set of fan characteristic curves is selected by a program module 31 and fed into a working memory. By monitoring the actual temperature of the coolant it is possible, by means of the program module 31, to find the working point in the relevant set of characteristic curves for the fan or the relevant characteristic curve at which the fan motor is to be operated. The result of this processing procedure is an activation signal to the output electronics of the fan motor. This activation signal is preferably a pulse width modulation ratio to which the output control of the fan motor is set.

Should the coolant set-point temperature predetermined by the engine management system vary, the prescribed process for the new coolant set-point temperature is performed by the program module 31 in order to select a new fan characteristic curve. The program module 31 as it were switches from a characteristic curve $K_{high}$ for the high coolant set-point temperature to a characteristic curve $K_{low}$ for a lower coolant set-point temperature. The actual temperature of the coolant is furthermore constantly monitored, so that a working point for the fan motor on the new fan characteristic curve $K_{low}$ can also be found and set. The change in the coolant set-point temperature and the change in the associated characteristic curve is analysed by a program subroutine 33. This checks whether the coolant set-point temperature has altered from a high temperature setting to a lower temperature setting. If so, a further program module, referred to as timer 1, is activated. In FIG. 3 the activation step is symbolically represented by the truth variable true. The timer 1 program module calculates and defines a minimum waiting time $\Delta t1$, during which the operating point of the fan motor is kept constant, as a function of further operating parameters of the system to be cooled. The suspension of the changes in the output control of the fan motor is suitably accomplished in such a way that the timer 1 program module triggers a switching operation 34 by means of which the activation of the fan motor is interrupted. Just how long the output control of the fan motor is suspended is determined from the current operating parameters of the internal combustion engine and the cooling system. Minimum waiting times of 5 seconds, 30 seconds and 60 seconds, symbolized in FIG. 3 as input variables 5, 30 and 60 to the timer 1 program module, are provided for. The main influencing variables in determining the minimum waiting time are the current engine load, the current air intake temperature of the internal combustion engine, the current actual temperature of the coolant and the magnitude of the temperature change in the predetermined coolant set-point temperature. In modern internal combustion engines the engine management system predetermines and sets up to three different coolant set-point temperatures on the coolant system of the internal combustion engine, depending on the output demanded of the internal combustion engine. Typical temperature levels for the coolant set-point temperatures are 80° C., 90° C. and 105° C. In the case of a change of coolant set-point temperature from 105° C. to 80° C., a minimum waiting time of 60 seconds is provided, whilst in the case of a change of coolant set-point temperature from 105° C. to 90° C. a minimum waiting time of 30 seconds is provided. The aforementioned minimum waiting times can be cut short where this is necessary in order to protect the cooling system of the internal combustion engine against overheating. In all cases, however, a minimum waiting time of 5 seconds is provided. The facility for discontinuing the minimum waiting times where there is a risk of overload represents a safeguard function for the internal combustion engine. This safeguard function is activated whenever the actual temperature of the coolant exceeds a critical value of 107° C., for example, when the air intake temperature of the internal combustion engine exceeds 50° C., or when the engine load of the internal combustion engine, determined from the speed of the internal combustion engine and the volumetric efficiency of the combustion cylinders exceeds 90% of the maximum load of the internal combustion engine. In these cases the timer 1 reduces the minimum waiting time to 5 seconds, or if the overload of the internal combustion engine occurs during the two longer minimum waiting times of 60 seconds and 30 seconds, the longer minimum waiting times are discontinued. The current engine load is likewise here calculated by the engine management system, and the current air intake temperature is determined by the engine control unit, and processed by the control program according to the invention. Such further processing is catered for by the timer 1 program module, which in the simplest case comprises comparative operations which serve to verify whether or not the operating parameters of the cooling system and the internal combustion engine lie within the respectively defined admissible ranges.

On expiry of the minimum waiting time determined by the timer 1, the low characteristic curve $K_{low}$, or more precisely the activation signal calculated on the basis of the low characteristic curve, is released to the fan motor. The high characteristic curve $K_{high}$ is not switched and remains active throughout. In FIG. 3 the enabling of the characteristic curve is symbolized by the switching operation 34, which may take the form of a switch or is preferably achieved by means of a switching operation incorporated in the program. If, after switching over the coolant set-point temperature and elapse of the minimum waiting time, the temperature difference between the new coolant set-point temperature and the current actual temperature of the coolant is so great that use of the fan is still necessary, the start-up of the fan now possible is damped by the control program according to the invention. This serves to prevent howling of the fan. Whether or not it is necessary to start up the fan is determined by the program module 31 in a manner known in the art by verifying whether the deviation of the actual temperature of the coolant is greater than can be tolerated.

The start-up of the fan is damped by an adjustable, digital filter 32 which filters the activation signal to the electronics of the fan motor. The filter ensures that the activation signal on the filter input side is transmitted to the filter output with a filter characteristic curve rising asymptotically to the input value. The filter is preferably a filter with so-called PT1 characteristic. These filters are characterized by an exponential filter characteristic curve, the time constant of the exponential function indicating the time by which the output signal has attained 66% of the value of the input signal. The effect of these filters can be modified and adjusted by selecting the time constant of the exponential function. The invention also makes use of this in that the filter constant of the filter 32 can be changed by means of a subroutine 35. In this case a time constant of 5 seconds and time constant of 60 seconds are provided. Switching over of the filter time constant is triggered by the timer 2 program module by activating a select operation 35. In FIG. 3 the select operation is represented as a switching operation but as a rule it is implemented as a programmed selection process.

The duration of the filter settings for the aforementioned filter 32 is adjusted by the timer 2 program module. The timer 2 program module here serves mainly for resetting the time constant of the filter 32 from a high time constant to a lower time constant. In the example of embodiment in FIG. 3 these are the two time constants, 5 seconds and 60 seconds, for influencing the time characteristic of the filter 32. The timer 2 here takes its timing from the output signal of the timer 1 program module. To be more precise the end of the minimum waiting time $\Delta t1$ is taken as the timed starting point for the activation of the timer 2 program module. On commencement of the minimum waiting time $\Delta t1$ or on release of the characteristic curve $K_{low}$, the time constant of the filter 32 is regularly set to its high value of, for example, 60 seconds. This setting remains active until such time as a switch-over signal from the timer 2 program module sets the filter constant back to the lower value of 5 seconds, for example. This reset signal is emitted by the timer 2 program module on expiry of a period $\Delta t2$, which follows on from the end of the minimum waiting time $\Delta t1$. This add-on time is usually 60 seconds, for example. If there are no special circumstances, the filter settings of the filter 32 remain active for the period of time $\Delta t2$ of 60 seconds, for example, after the minimum waiting time $\Delta t1$ has elapsed.

Special circumstances do exist, however, where there is a risk of overheating due to a high damping effect of the filter 32. This risk may occur if the filter settings only permit a slow starting up of the fan. For this reason a safeguard function, by means of which it is possible to shorten the duration of the filter settings, is provided by the timer 2 program module. For this purpose the timer 2 program module also reads the air intake temperature of the internal combustion engine and the current engine load of the internal combustion engine by monitoring the corresponding characteristic variables from the engine control unit. If the air intake temperature exceeds a value of 50° C. or if the engine load exceeds a value of 90% of the maximum possible engine load, the time constant of the filter 32 is immediately reset to the lower value of 5 seconds. This makes it possible to run the fan up to its maximum output more rapidly where there is a risk of overload. That is to say the fan takes effect more rapidly in the case of a smaller time constant of the filter 32.

The interaction of the individual program modules, as described in FIG. 3, and the operating principle of the control program according to the invention will be explained again with reference to FIG. 4.

Figure 4:
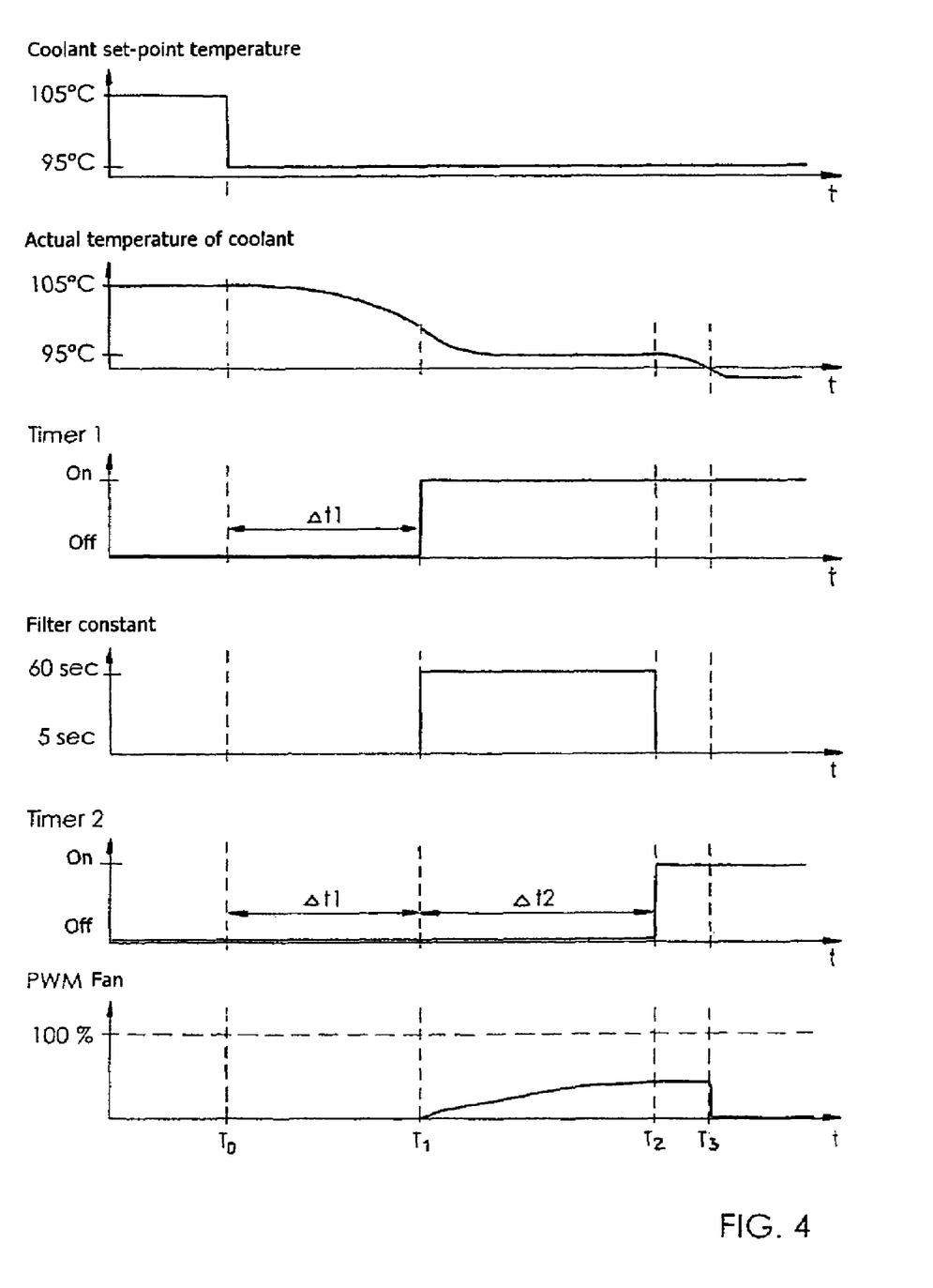
FIG. 4 shows a chronological sequence for the settings affected by the signal flow chart according to FIG. 3 and the timing of their influence on the fan and the actual temperature of the coolant.

FIG. 4 shows a total of six related time diagrams, the first of which shows the time curve for the coolant set-point temperature, the second the curve for the actual temperature of the coolant, the third the time curve for the signal level at the output of the timer 1 program module, the fourth the switching-over of the filter constant of the filter 32, the fifth the signal level curve at the output of the timer 2 program module and the sixth finally the effects of the adjustments made by the control program on the PWM ratio in order to activate the fan motor. The starting point for the entire process is the switching of the coolant set-point temperature from a high value, in this case 105° C., for example, to a lower value here of 95° C., for example. On switching over, the primary control for regulating the temperature in the cooling system is first activated. That is to say the thermostat 11 of the primary control is switched in such a way that the actual temperature of the coolant begins to fall. For a period $\Delta t1$, which is calculated and set by the timer 1 program module, the output control of the fan remains switched off until time T1. Once the minimum waiting time $\Delta t1$ has elapsed, fan activation is enabled. However, the fan is activated via the filter 32, which initially operates with the time constant of 60 seconds. The timer 2 program module determines how long the filter settings are maintained. The timer 2 program module calculates and defines a period of time $\Delta t2$ after which the filter constant of the filter 32 is set from 60 seconds back to 5 seconds. Thereafter, that is to say from time T2, the filter functions with the time constant of 5 seconds until the next change in the coolant set-point temperature. In the majority of cases resetting the time constant will have no further influence on the pulse width modulation. That is to say, in the majority of cases once the period Δt2 has elapsed, i.e. until time T2, the fan motor will be run up to its working point on the new characteristic curve released. Resetting the time constant, however, has the advantage that the fan control can react with a shorter time constant to a change in the working point. This means that with a shorter time constant of the filter the fan motor is better able to track any migration of the working point on the fan characteristic curve.

At the end of the minimum waiting time Δt1 the actual temperature of the coolant should as a rule have been brought below the trip-on threshold for the fan motor by means of the primary control. In the example of embodiment here under discussion this trip-on threshold is 95° C. If the coolant temperature has not dropped below this trip-on threshold, once the minimum waiting time Δt1 has elapsed at time T1 the fan comes on with a damped start-up. The damping of the fan start-up means that the activation signal for the pulse width modulation (PWM) of the fan makes an asymptotic approach to the working point on the fan characteristic curve. An example of this curve is represented in the sixth diagram of FIG. 4. In the diagram for the actual temperature of the coolant, the starting-up of the fan motor naturally produces a more rapid reduction of the actual temperature of the coolant to the new coolant set-point temperature of 95° C. Once the actual temperature of the coolant reaches the new coolant set-point temperature at time T3, the fan assistance is no longer necessary and the fan can be switched off. The fan is switched off by the pulse duty factor for the PWM going to zero.

It will be appreciated that the above description of the present invention is susceptible to various modifications, changes and adaptations, and the same are intended to be comprehended within the meaning and range of equivalents of the appended claims.

What is claimed is:

1. A cooling system for an internal combustion engine comprising:
    a small cooling circuit without a radiator, a large cooling circuit with a radiator and a motor driven fan which is associated with the radiator;
    both said cooling circuits are interconnected by a thermostatic valve, said thermostatic valve regulating the flow of coolant through both said small and large cooling circuits,
    control means for controlling operation of said thermostatic valve and for controlling operation of the motor of said fan so as to achieve an objective temperature of said coolant, which is set by a temperature setting means,
    said temperature setting means selecting the objective temperature out of several objective temperatures depending on the actual demand of said internal combustion engine; and, wherein
    said control means, for different objective temperatures, use different motor characteristic curves ($K_{high}$, $K_{low}$) for control of power to the motor of the fan according to the characteristic curve ($K_{high}$, $K_{low}$),
    if said objective temperature is changed from a higher to a lower objective temperature, the actual operation of the fan motor is maintained at a constant power level for an adjustable minimum waiting time (Δt1) so as to avoid howling up of the fan, and,
    in the event of a change in the objective temperature, the control means changes the characteristic curve ($K_{high}$, $K_{low}$), and a damping filter is switched into a power control line for activation of the fan motor.

2. Cooling system according to claim 1, wherein the filter has a PT1 characteristic.

3. Cooling system according to claim 1, wherein the minimum waiting time (Δt1) can be adjusted and set by a program module (TIMER1).

4. Cooling system according to claim 1, wherein the characteristic of the filter can be adjusted and set by a second program module (TIMER2).

5. Cooling system according to claim 4, wherein a time constant of the filter and a duration (Δt2) of the filter settings can be adjusted by the second program module (TIMER2) and by a select function.

6. Cooling system according to claim 1, wherein the minimum waiting time (Δt1) can be adjusted as a function of a set temperature level or relevant engine operating parameters.

7. Cooling system according to claim 1, wherein a time constant of the filter can be adjusted as a function of relevant operating parameters.

8. Cooling system according to claim 6, wherein the operating parameters are engine load and air intake temperature of an internal combustion engine.

9. Cooling system according to claim 7, wherein the operating parameters are engine load and air intake temperature of an internal combustion engine.

10. Cooling system according to claim 1, wherein the minimum waiting time (Δt1) can be adjusted and set by a program module (TIMER1).

11. Cooling system according to claim 10, wherein the characteristic of the filter can be adjusted and set by a second program module (TIMER2).

12. Cooling system according to claim 11, wherein a time constant of the filter and duration (Δt2) of filter settings can be adjusted by the second program module (TIMER2) and by a select function.

13. Cooling system according to claim 1, wherein the characteristic curves are at least of motor speed verses actual coolant temperature.

* * * * *